United States Patent [19]
Yoshioka et al.

[11] Patent Number: 6,058,006
[45] Date of Patent: May 2, 2000

[54] ELECTROLYTIC CAPACITOR

[75] Inventors: Toshikiyo Yoshioka; Makoto Shimizu; Takato Itoh, all of Tokyo, Japan

[73] Assignee: Nippon Chemi-Con Corporation, Tokyo, Japan

[21] Appl. No.: 09/131,679

[22] Filed: Aug. 10, 1998

[30] Foreign Application Priority Data

| Oct. 3, 1997 | [JP] | Japan | 9-287773 |
| Mar. 27, 1998 | [JP] | Japan | 10-100228 |
| Apr. 24, 1998 | [JP] | Japan | 10-131243 |
| May 28, 1998 | [JP] | Japan | 10-164328 |
| Jul. 2, 1998 | [JP] | Japan | 10-202790 |

[51] Int. Cl.$^7$ ................ H01G 9/02; H01G 4/32
[52] U.S. Cl. ............ 361/511; 361/512; 361/518; 361/530; 361/536; 252/62.2
[58] Field of Search ................ 361/502, 504, 361/506, 511, 512, 517–519, 530, 535–537; 29/25.03; 252/62.2

[56] References Cited

U.S. PATENT DOCUMENTS

| 4,480,290 | 10/1984 | Constanti et al. | 361/502 |
| 4,888,666 | 12/1989 | Naitoh et al. | 361/512 |
| 5,055,974 | 10/1991 | Washio et al. | 361/527 |
| 5,057,972 | 10/1991 | Ishii | 361/512 |
| 5,661,629 | 8/1997 | MacFarlane et al. | 361/505 |

*Primary Examiner*—Kristine Kincaid
*Assistant Examiner*—Anthony Dinkins
*Attorney, Agent, or Firm*—Sughrue, Mion, Zinn Macpeak & Seas, PLLC

[57] ABSTRACT

Disclosed is an electrolytic capacitor comprising a capacitor element formed by winding an anode foil having pits with a diameter of not less than 0.1 $\mu$m formed on the surface thereof and a cathode foil with a separator provided interposed therebetween, the separator having been coated with PVA which is then dried, the capacitor element being in contact with an electrolytic solution for electrolytic capacitor containing ethylene glycol, whereby the electrolytic solution is gelled. An electrolytic capacitor which comprises a capacitor element formed by winding an anode foil and a cathode foil with a separator provided interposed therebetween, the separator having been prepared by mixing filament fibers formed by extruding PVA solution into a gas, the capacitor element being impregnated with an electrolytic solution, is also disclosed. An electrolytic capacitor which is prepared by a process which comprises impregnating a capacitor element formed by winding an anode foil, a cathode foil and a separator with a driving electrolytic solution, inserting the capacitor element into an outer case, sealing the opening of the outer case with a sealing member, and then subjecting the anode to reformation, wherein the driving electrolytic solution contains boric acid and a polyvinyl alcohol is attached to at least both the upper and lower end faces of the capacitor element, is further disclosed. Proper selection of the form of PVA in the electrolytic capacitor of the present invention allows PVA dissolved in the electrolytic solution to effectively act on the electrode foil, making it possible to improve the withstand voltage and overvoltage resistance without raising the dielectric loss of the electrolytic capacitor.

12 Claims, 2 Drawing Sheets

ELECTROLYTIC CAPACITOR

FIELD OF THE INVENTION

The present invention relates to an electrolytic capacitor and more particularly to an electrolytic capacitor for middle and high voltage.

BACKGROUND OF THE INVENTION

An electrolytic capacitor has a small size and a large capacitance, can be produced at a low cost and exhibits excellent properties in smoothening of rectified output. It is one of important elements constituting various electric and electronic devices.

In general, an electrolytic capacitor comprises as an anode a so-called valve metal such as aluminum and tantalum having an oxide layer formed thereon as a dielectric layer. A cathode is disposed opposed to the anode with a separator provided interposed therebetween. An electrolytic solution is held in the separator.

The formed foil which acts as anode is prepared by etching a foil made of a high purity valve metal to increase the surface area thereof, and then applying a voltage to the foil in an electrolytic solution to form an oxide layer thereon. The withstand voltage of the oxide layer as dielectric material is determined by the voltage applied during the formation. The cathode foil as cathode is made of an etched high purity foil.

The separator prevents the anode and the cathode from being short-circuited to each other and holds an electrolytic solution. As the separator there is used a thin low density paper such as kraft paper and manila paper.

The anode foil having a tab connected thereto and the cathode foil having a tab connected thereto are then laminated with the separator provided interposed therebetween. The laminate is then wound to prepare a capacitor element. The capacitor element is then impregnated with an electrolytic solution. The capacitor element is inserted into a case which is then hermetically sealed. The anode foil is then subjected to reformation to prepare an electrolytic capacitor.

As previously mentioned, the electrolytic solution for electrolytic capacitor is brought into direct contact with the dielectric layer to act as a true cathode. In other words, the electrolytic solution is provided interposed between the dielectric material and the collector cathode in the electrolytic capacitor. This means that the resistivity of the electrolytic solution is inserted in series with the electrolytic capacitor. Accordingly, the electrical conductivity of the electrolytic solution has an effect on the magnitude of the dielectric loss of the capacitor. The voltage at which the aluminum foil undergoes shortcircuiting in the electrolytic solution is called sparking voltage of electrolytic solution. It indicates the oxide film-forming properties of electrolytic solution.

Boric acid and organic dicarboxylic acids such as sebacic acid and azelaic acid have heretofore been used as electrolytic solutions for middle and high voltage because they can provide a relatively high sparking voltage. In some cases, butyloctanedioic acid, which provides a high sparking voltage and exhibits a high electrical conductivity, is used as a solute (JP-B-60-13296 (The term "JP-B" as used herein means an "examined Japanese patent publication")). In some recent cases, 1,7-octanedicarboxylic acid is used (JP-A-2-224217 (The term "JP-A" as used herein means an "unexamined published Japanese patent application")).

However, in recent years, electronic apparatus comprising a switching power supply have been widely used in the home. Thus, there is a growing demand for the safety of electrolytic capacitors. In other words, the switching power supply incorporated in these electronic apparatus comprises an electrolytic capacitor. In a working atmosphere where the electric power supplied is unstable, an excess voltage may be applied to the electrolytic capacitor. Thus, there is a growing demand for a high safety electrolytic capacitor which can withstand the excess voltage. However, electrolytic capacitors comprising an electrolytic solution as previously mentioned cannot meet this demand. It has thus been desired to provide electrolytic capacitors having a higher withstand voltage and overvoltage resistance.

Further, electronic apparatus such as invertor having an improved efficiency have been demanded. To this end, these apparatus have been able to operate at a higher frequency. In order to cope with this tendency, the electrolytic capacitors used must accordingly operate at a higher frequency. The electrolytic capacitors comprising an electrolytic solution as previously mentioned cannot meet this demand, too. It has thus been desired to provide electrolytic capacitors having a lower dielectric loss.

SUMMARY OF THE INVENTION

It is therefore a first object of the present invention to provide an electrolytic capacitor for middle and high voltage which exhibits higher withstand voltage characteristics and overvoltage resistance. It is a second object of the present invention to provide an electrolytic capacitor for middle and high voltage which exhibits a lower dielectric loss.

The first aspect of the present invention concerns an electrolytic capacitor, comprising a capacitor element formed by winding an anode foil having pits with a diameter of not less than 0.1 $\mu$m formed on the surface thereof and a cathode foil with a separator provided interposed therebetween, said separator having been coated with a polyvinyl alcohol which is then dried, said capacitor element being in contact with an electrolytic solution for electrolytic capacitor containing ethylene glycol, whereby said electrolytic solution is gelled.

In the foregoing electrolytic capacitor, the electrolytic solution contains boric acid.

In the foregoing electrolytic capacitor, the amount of polyvinyl alcohol attached to said separator is from 0.1 to 50.0 g/m$^2$.

The second aspect of the present invention concerns an electrolytic capacitor, comprising a capacitor element formed by winding an anode foil and a cathode foil with a separator provided interposed therebetween, said separator having been prepared by mixing filament fibers formed by extruding a polyvinyl alcohol into a gas, said capacitor element being impregnated with an electrolytic solution.

In the foregoing electrolytic capacitor, the electrolytic solution contains ethylene glycol and boric acid.

In the foregoing electrolytic capacitor, a polyvinyl alcohol having a saponification degree of not less than 90 mol-% is used.

The third aspect of the present invention concerns an electrolytic capacitor prepared by a process which comprises impregnating a capacitor element formed by winding an anode foil, a cathode foil and a separator with a driving electrolytic solution, inserting said capacitor element into an outer case, sealing the opening of said outer case with a sealing member, and then subjecting said anode to reformation, wherein said driving electrolytic solution contains boric acid and a polyvinyl alcohol is attached to both the upper and lower end faces of said capacitor element.

In the electrolytic capacitor according to the first, second and third aspects of the present invention comprising an electrolytic solution containing boric acid, the content of boric acid is from 0.1 to 40 wt-%.

In the electrolytic capacitor according to the first, second and third aspects of the present invention comprising an electrolytic solution containing boric acid, the electrolytic solution contains a dicarboxylic acid having side chains, derivative thereof or salt thereof in an amount of from 0.1 to 35 wt-%.

In the foregoing electrolytic capacitor, the content of said dicarboxylic acid having side chains, derivative thereof or salt thereof is from 0.5 to 3 wt-% and the content of boric acid is from 5 to 40 wt-%.

In the foregoing electrolytic capacitor, the content of said dicarboxylic acid having side chains, derivative thereof or salt thereof is from 5 to 25 wt-% and the content of boric acid is from 0.1 to 5 wt-%.

In the electrolytic capacitor according to the first, second and third aspects of the present invention comprising an electrolytic solution containing boric acid, the electrolytic solution contains a $C_{6-10}$ straight-chain aliphatic saturated dicarboxylic acid, aromatic monocarboxylic acid or salt thereof in an amount of from 0.1 to 35 wt-%.

DETAILED DESCRIPTION OF THE INVENTION

Figure 1:
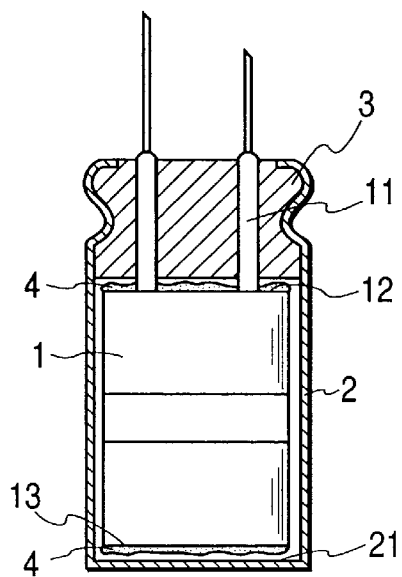
FIG. 1 is a sectional view illustrating an embodiment of the present invention.

The electrolytic capacitor according to the first aspect of the present invention will be further described hereinafter.

The separator to be incorporated in the electrolytic capacitor according to the present invention has been coated with a polyvinyl alcohol (hereinafter referred to as "PVA") solution which is then dried so that it is attached thereto. The application of PVA solution to the separator can be normally accomplished by applying PVA solution to the surface of the separator using a comma reverse coating machine. Alternatively, the separator may be dipped in PVA solution so that PVA solution is applied thereto. The separator thus coated with PVA solution is then dried. PVA solution thus applied then penetrates into the separator. After dried, PVA is provided between the fibers of the separator and attached to the fibers (hereinafter referred to as "PVA-coated paper").

As the separator there may be used nonwoven fabric, manila paper, kraft paper, cellulose paper or the like. Alternatively, a separator made of synthetic high molecular fibers may be used. The density of the separator is from 0.15 to 0.9 g/cm³, preferably from 0.15 to 0.65 g/cm³. If the density of the separator falls below this range, the resulting separator exhibits a deteriorated strength. On the contrary, if the density of the separator exceeds this range, the resulting capacitor exhibits great tan δ (dielectric loss). The thickness of the separator is from 20 to 150 μm, preferably from 20 to 80 μm. If the thickness of the separator falls below this range, the resulting separator exhibits a deteriorated strength. On the contrary, if the thickness of the separator exceeds this range, the resulting capacitor exhibits great tan δ.

As PVA to be attached to the separator there may be used a commercially available PVA. The polymerization degree of PVA is from 200 to 3,500. Referring to saponification degree, PVA having a saponification degree ranging from partially-saponified products having a saponification degree of 70 mol-% to fully saponified products having a saponification degree of not less than 99.5 mol-% may be used. The saponification degree of PVA is preferably not less than 90 mol-%.

As the anode foil there is used one prepared as follows. A metal foil for electrolytic capacitor is subjected to electrolysis in an acidic solution to form pits on the surface thereof. The metal foil is then subjected to etching by chemical dissolution in a high temperature acidic solution to increase the diameter of pits and hence the surface area thereof. The metal foil thus etched is then pre-treated. A voltage is then applied to the metal foil in an aqueous solution of an acid such as boric acid and phosphoric acid or salt thereof until it reaches a predetermined value. The predetermined voltage is kept for a predetermined period of time. The metal foil is subjected to depolarization treatment. A voltage is then again applied to the metal foil to form a dielectric oxide layer thereon. During this procedure, an oxide layer is formed on the surface of the metal foil enlarged by etching. Similarly, an oxide layer is formed inside the pits. Accordingly, the diameter of the pits in the anode foil on which an oxide layer has been formed is smaller than that of the pits in the metal foil which has been etched. In the present invention, an anodized anode foil having pits with a diameter of not less than 0.1 μm formed therein is used.

As the cathode foil to be used in the present invention there may be used a foil made of a metal such as aluminum for use in ordinary electrolytic capacitors.

The foregoing anode foil and cathode foil are then wound with the separator provided interposed therebetween to prepare a capacitor element. The capacitor element thus prepared is then impregnated with an electrolytic solution. The capacitor element thus treated is inserted into a case which is then hermetically sealed with a sealing member.

In the present invention, PVA attached to the separator comes in contact with the electrolytic solution which has impregnated in the pits in the anode foil to cause the electrolytic solution to be gelled with ethylene glycol in the electrolytic solution. Since the diameter of the pits on the surface of the anode foil is not less than 0.1 μm, there are voids wide enough for the gel to enter deep into the pits. Accordingly, PVA can penetrate deep into the pits to form a gel having a good adhesivity to the dielectric layer. Thus, PVA can be uniformly mixed with the electrolytic solution in the form of gel to provide an electrolyte having a high sparking voltage that enhances the withstand voltage of the resulting electrolytic capacitor. In this arrangement, the resulting electrolyte exhibits a large contact area and a good adhesivity with respect to the dielectric layer. Thus, the resulting electrolytic capacitor shows no rise dielectric loss.

The behavior of the foregoing gelation can be presumed as follows. When the capacitor element according to the present invention is brought into contact with the electrolytic solution, the electrolytic solution penetrates into the pits in the anode foil. Thereafter, PVA attached to the separator comes in contact with the electrolytic solution held in the pits so that gelation by ethylene glycol in the electrolytic solution and PVA proceeds to obtain a gelled electrolyte having a good adhesivity to the dielectric film. In this case, if the diameter of the pits is not less than 0.1 μm, a good gel is formed inside the pits. In this arrangement, an electrolyte having a high sparking voltage and a good adhesivity to the dielectric material can be obtained. Thus, an electrolytic capacitor having a high withstand voltage and a low dielectric loss can be obtained.

In accordance with this method, the gelation by the electrolytic solution and PVA proceeds in a good state to form a uniform dispersion of PVA in the electrolyte. Probably because of the action of PVA, the resulting electrolytic capacitor exhibits improved overvoltage resistance. If the electrolytic solution contains boric acid, better gelation can be provided, further improving overvoltage resistance.

It is also thought that the rest of PVA which has been left undissolved and unreacted in the electrolytic solution is present between the main fibers of the separator and attached to the main fibers, and the comprehensive state in which the electrolytic solution is held in the separator having PVA attached to its main fibers maintains a high electrical conductivity. If PVA having a saponification degree of not less than 90 mol-% is used, a higher withstand voltage can be obtained.

This is probably because if PVA solution is applied and dried, PVA solution which has been applied penetrates into the separator, and PVA, after dried, is uniformly attached between the fibers of the separator.

If the capacitor element is impregnated with an electrolytic solution having PVA incorporated therein, inserted into a case which is then hermetically sealed, and then heated to cause the electrolytic solution to be gelled, the withstand voltage characteristics, overvoltage resistance, etc. cannot be so improved, and the dielectric loss is raised. This is probably because the electrolytic solution is not fairly gelled, and the electrolytic solution which has been gelled doesn't adhere to the dielectric film in a good state.

The electrolytic capacitor according to the second aspect of the present invention will be further described hereinafter.

The separator to be incorporated in the electrolytic capacitor of the present invention is prepared as follows. PVA solution is subjected to so-called dry spinning to form PVA fibers. In some detail, PVA solution is extruded into an inert gas or air through a fine spinneret so that it is spun while the solvent is being diffused into the inert gas or air to form a filament yarn which is then wound. In an ordinary drying spinning process, the filament yarn is then drawn and heat-treated. However, this treatment is not effected in the present invention. (The separator thus formed will be hereinafter referred to as "separator formed by mixing PVA fibers")

The aqueous solution of PVA used herein has a concentration of from 30 to 40%. It is preferred that PVA solution be spun in hot air. PVA to be used herein may have a polymerization degree of from 400 to 3,500. Referring to saponification degree, PVA having a commonly used saponification degree ranging from partially-saponified products having a saponification degree of about 70 mol-% to fully-saponified products having a saponification degree of not less than 99 mol-% may be used. Preferably, PVA having a saponification degree of not less than 90 mol-% is used.

Subsequently, in order to produce the main fibers of the separator, a pulp of Manila hemp, kraft or other materials used for ordinary electrolytic paper is subjected to treatment such as disaggregation, and then beaten. The pulp is then mixed with the foregoing PVA fibers. The mixture is then subjected to paper making to produce an electrolytic paper which is then cut to provide the separator of the present invention.

The kind and CSF of the starting material pulp as main fiber of the separator are not specifically limited. Manila hemp, sisal, kraft, esparto, hemp or mixture may be used.

The starting material pulp is subjected to treatment such as disaggregation, dusting and dehydration, beaten, and then mixed with PVA fibers. The mixing proportion of the main fiber and PVA fiber is preferably from 95:5 to 60:40. The paper making of the mixture is accomplished by means of cylinder paper machine, Fourdrinier paper machine, combination thereof or the like.

The density of the separator is from 0.15 to 0.9 g/cm$^3$, preferably from 0.15 to 0.65 g/cm$^3$. If the density of the separator falls below the above defined range, the resulting separator exhibits an insufficient strength. On the contrary, if the density of the separator exceeds the above defined range, the resulting electrolytic capacitor exhibits a raised tan δ value. The thickness of the separator is from 20 to 150 μm, preferably from 20 to 80 μm. If the thickness of the separator falls below the above defined range, the resulting separator exhibits an insufficient strength. On the contrary, if the thickness of the separator exceeds the above defined range, the resulting electrolytic capacitor exhibits a raised tan δ value.

The anode foil and the cathode foil are then wound with the foregoing separator provided interposed therebetween to prepare a capacitor element. The capacitor element thus prepared is impregnated with the previously mentioned electrolytic solution, and then inserted into an outer case which is then hermetically sealed with a sealing material. Finally, the capacitor element is subjected to ordinary treatment. In some detail, a voltage is applied to the capacitor element under heating so that the capacitor element is subjected to reformation. Thus, an electrolytic capacitor of the present invention is prepared.

The electrolytic capacitor thus prepared exhibits a higher withstand voltage than electrolytic capacitors comprising an ordinary electrolytic paper free of PVA fibers of the present invention and maintains a low dielectric loss. Further, the electrolytic capacitor thus prepared exhibits good high-temperature durability and overvoltage resistance.

If the saponification degree of PVA to be used in the production of PVA fibers is not less than 90 mol-%, the overvoltage resistance is further improved.

If as the fiber to be mixed in the separator there is used a fiber obtained by spinning from PVA solution by a method other than the method of the present invention, e.g., ordinary vinylon, the withstand voltage is not enhanced.

The mechanism of this phenomenon can be presumed as follows. In the present invention, during the preparation of the electrolytic capacitor, PVA fibers mixed in the separator of the present invention are dissolved in and reacted with the electrolytic solution to raise the sparking voltage of the electrolytic solution. If the electrolytic solution contains ethylene glycol and boric acid, this reaction is accelerated, further raising the sparking voltage of the electrolytic solution. Further, the rest of PVA which has been left undissolved and unreacted in the electrolytic solution is present between the main fibers of the separator and attached to the main fibers, and the comprehensive state in which the electrolytic solution is held in the separator having PVA attached to its main fibers gives a high withstand voltage and overvoltage resistance and maintains a low dielectric loss, although the reason for the mechanism is unknown.

The electrolytic capacitor according to the third aspect of the present invention will be further described hereinafter.

Figure 4:
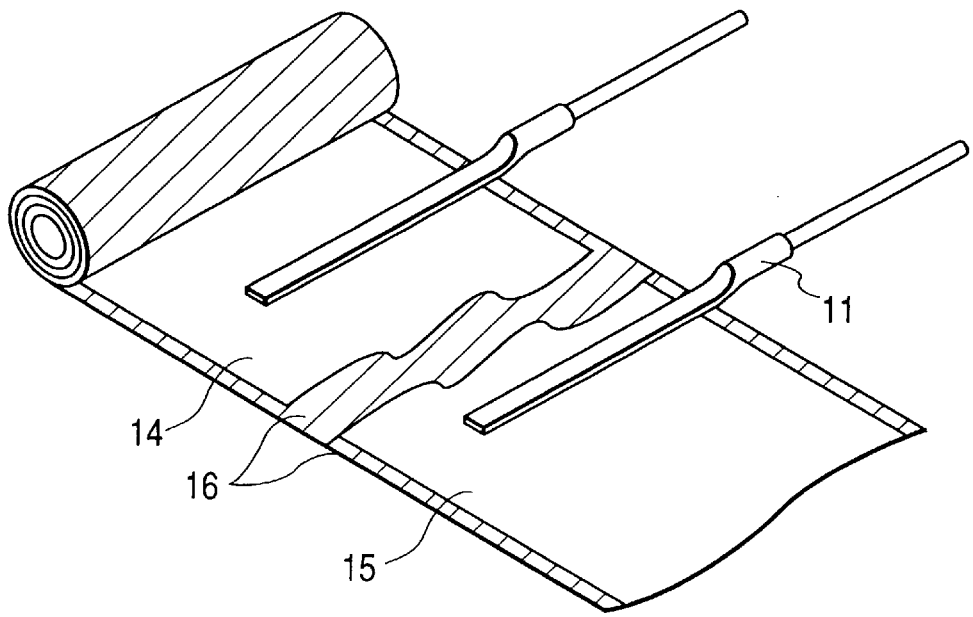
FIG. 4 is a diagram illustrating the structure of a capacitor element.
Figure 5:
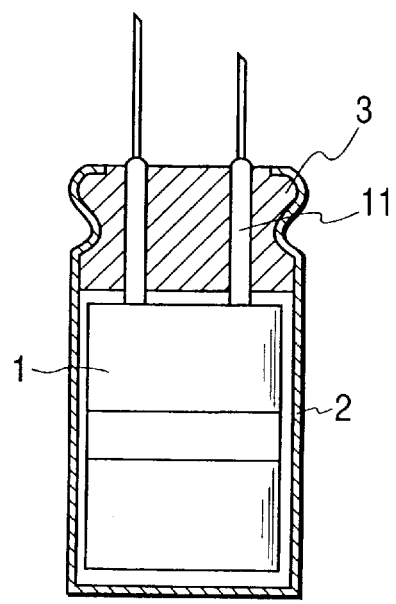
FIG. 5 is a sectional view illustrating a conventional example.

As shown in FIG. 4, an anode foil 14 having an anodized film formed on the surface of a valve metal foil and a cathode foil 15 made of a valve metal foil are wound with a separator 16 made of paper or the like to prepare a capacitor element 1. The capacitor element thus prepared is inserted into an outer case which is then hermetically sealed with a sealing member.

In the present invention, in the foregoing electrolytic capacitor, a layer of PVA is formed on at least both the upper and lower end faces of the capacitor element. The layer of PVA can be formed by applying or spraying PVA onto the upper and lower end faces of the capacitor element so that it is attached thereto. PVA to be used herein may be in any form such as powder and fiber so far as it can form a layer on the upper and lower end faces of the capacitor element. Further, the layer of PVA may be formed on the side face of the capacitor element. In other words, as shown in FIG. 1, a layer of PVA (hereinafter PVA layer) 4 is formed on the end face 12 and the end face 13 of the capacitor element. Referring to the method for forming PVA layer 4, as shown in FIG. 4, the anode foil 14 and the cathode foil 15 are wound with the separator 16 to prepare the capacitor element 1 which is then impregnated with the foregoing electrolytic solution. Subsequently, as shown in FIG. 1, PVA layer 4 is formed on the end face 12 and the end face 13 of the capacitor element by any method such as coating. The capacitor element thus prepared is inserted into the outer case 2 which is then hermetically sealed with the sealing member 3. The capacitor element is then subjected to heat treatment. Thereafter, a voltage is applied to the electrolytic capacitor under heating so that the electrolytic capacitor is subjected to reformation. Thus, an electrolytic capacitor of the present invention is prepared.

Figure 2:
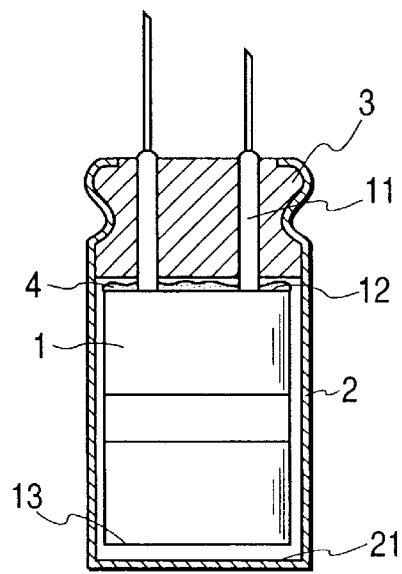
FIG. 2 is a sectional view illustrating another embodiment of the present invention.

Alternatively, an electrolytic capacitor can be prepared by forming PVA layer 4 on the end face 12 of the capacitor element 12 alone. The capacitor element 1 thus prepared is inserted into the outer case 2 which is then hermetically sealed with the sealing member 3. Subsequently, the capacitor element 1 is subjected to heat treatment in such an arrangement that the end face on which PVA layer has been formed is higher in position than the other end face. In this case, the electrolytic capacitor is positioned as shown in FIG. 2 during the heat treatment. Thereafter, a voltage is applied to the electrolytic capacitor under heating so that the electrolytic capacitor is subjected to reformation to prepare an electrolytic capacitor according to the present invention. In FIG. 2, PVA layer may be formed on the end face 13 which faces the inner bottom of the outer case 2. In this case, heat treatment is effected in such an arrangement that the position of the electrolytic capacitor is reversed from that of FIG. 2. The electrolytic capacitor is then subjected to reformation.

Figure 3:
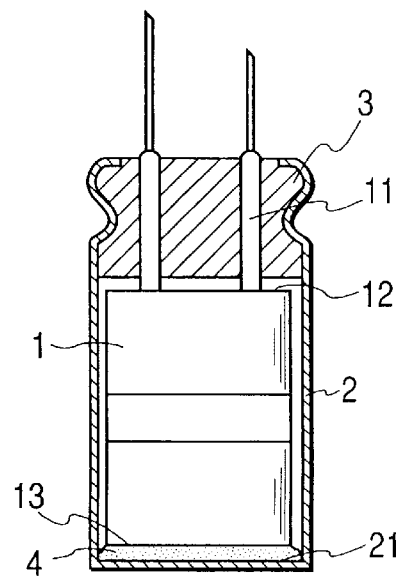
FIG. 3 is a sectional view illustrating a further embodiment of the present invention.

Alternatively, an electrolytic capacitor of the present invention can be prepared by forming PVA layer 4 on the inner bottom 21 of the outer case 2. PVA layer can be formed by placing on the inner bottom 21 of the outer case 2 the same PVA as used in the formation of PVA layer on both the two end faces of the capacitor element. Subsequently, as shown in FIG. 4, the capacitor element 1 prepared by winding the anode foil 14 and the cathode foil 15 with the separator 16 is impregnated with the foregoing electrolytic solution, and then inserted into the outer case 2 which is then hermetically sealed with the sealing member 3. In this case, heat treatment is effected in such an arrangement that the bottom of the outer case faces upward, i.e., the position of the electrolytic capacitor is reversed from that of FIG. 3. Thereafter, the electrolytic capacitor is then subjected to reformation.

As PVA to be used herein there may be used a commercially available PVA. Referring to saponification degree, PVA having a saponification degree ranging from partially-saponified products having a saponification degree of 75 mol-% to fully saponified products having a saponification degree of not less than 99.5 mol-% may be used.

The electrolytic capacitor thus prepared exhibits a high withstand voltage and a good overvoltage resistance and maintains a low dielectric loss.

The reason why the electrolytic capacitor of the present invention shows such a behavior can be thought as follows. The electrolytic capacitor of the present invention is prepared by a process which comprises inserting a capacitor element 1 into an outer case 2 which is then hermetically sealed with a sealing material 3, and then subjecting the capacitor element to heat treatment so that a PVA layer is formed on both end faces 12 and 13 of the capacitor element. In other words, if a PVA layer is formed on only one end face of the capacitor element, heat treatment is effected in such an arrangement that the end face on which PVA layer has been formed is positioned higher the other end face. Therefore, PVA in PVA layer thus formed reaches the other end face of the capacitor element along the side face of the capacitor element to form another PVA layer thereon. Further, since the electrolytic solution of the present invention contains boric acid, PVA in these PVA layers is dissolved in the electrolytic solution in a good state. As a result, the electrolytic solution on both the end faces of the capacitor element exhibits a raised sparking voltage. The foil which acts as an anode foil for electrolytic capacitor which has been formed is cut to the length according to the size of the capacitor element, and then wound with a separator to prepare an electrolytic capacitor element. Accordingly, the section of the formed foil is exposed at both ends of the capacitor element. Since the sparking voltage of the electrolytic solution present at these areas is raised, the withstand voltage of the section of the formed foil, which exhibits the lowest withstand voltage in the formed foil, can be raised by raising the reformation voltage. As a result, the withstand voltage of the electrolytic capacitor is raised.

Further, it is thought that when the anode foil 14 and the electrode tab 11 are connected to each other, some oxide layer comes off the anode foil. Since there is a gap between the electrode tab and the separator 16 in the capacitor element thus wound, PVA in the PVA layer formed on the end face of the capacitor element is dissolved in the electrolytic solution in the gap, raising the sparking voltage of the electrolytic solution at this area. Thus, the withstand voltage of the area of the anode foil from which an oxide layer has come off can be raised similarly to the section of the formed foil. Accordingly, the withstand voltage of the entire electrolytic capacitor can be raised.

PVA in the PVA layer formed on the end face of the capacitor element is dissolved in the electrolytic solution on the end face of the capacitor element. Since the amount of PVA dissolved in the electrolytic solution contained inside the capacitor element is small enough to prevent the rise in the electrical conductivity of the electrolytic solution, making it possible to keep the dielectric loss of the electrolytic capacitor low.

Further, when an overvoltage is applied to the electrolytic capacitor of the present invention, it is also applied to the anode foil which then generates heat. This heat generation causes PVA in the PVA layer formed on the end face of the capacitor element to be rapidly dissolved in the electrolytic solution. This rapidly raises the sparking voltage of the electrolytic solution. As a result, the sparking voltage exceeds the overvoltage, inhibiting ignition. Thereafter, if the overvoltage is continuously applied to the electrolytic capacitor, the film forming at the oxide layer on the end faces of the capacitor element continues. During this procedure, heat generation and gas production occur, causing the valve of the electrolytic capacitor to open. Thereafter, the solvent component is evaporated away from the electrolytic solution. This causes so-called dry-up state that makes the electrolytic capacitor open.

If the electrolytic solution is free of boric acid, PVA makes the electrolytic solution semisolid when it is dissolved therein. Thus, the withstand voltage of the electrolytic capacitor cannot be raised.

If PVA is incorporated in the electrolytic solution to keep the withstand voltage of the electrolytic solution high enough, the resulting electrolytic solution exhibits a raised viscosity that makes it difficult for itself to penetrate into the capacitor element and raises the electrical conductivity thereof. Thus, the withstand voltage of the electrolytic capacitor cannot be raised as high as the present invention.

The electrolytic solution will be further described hereinafter.

In the electrolytic capacitor of the present invention, the electrolytic solution comprises boric acid incorporated therein to further improve withstand voltage and overvoltage resistance. The content of boric acid is from 0.1 to 40 wt-%. If the content of boric acid falls below 0.1 wt-%, the resulting withstand voltage is lowered. On the other hand, if the content of boric acid exceeds 40 wt-%, the resulting tan $\delta$ value is raised.

The first embodiment of the electrolytic solution of the present invention comprises a dicarboxylic acid having side chains, derivative thereof or salt thereof incorporated therein in addition to boric acid. Examples of the dicarboxylic acid having side chains include 1,6-decanedicarboxylic acid, 5,6-decanedicarboxylic acid, 1,10-decanedicarboxylic acid, 1,7-octanedicarboxylic acid, 2,4,7,6-tetramethyl-1,10-decanedicarboxylic acid, 2,4,7,9-tetramethyl-1,6-decanedicarboxylic acid, 2,4,7,6-tetramethyl-5,6-decanedicarboxylic acid, and 7-methyl-7-methoxycarbonyl-1,9-decanedicarboxylic acid. Examples of the derivative of these dicarboxylic acids include 7,9-dimethyl-7,9-dimethoxycarbonyl-1,11-dodecanedicarboxylic acid, and 7,8-dimethyl-7,8-dimethoxycarbonyl-1,14-tetradecanedicarboxylic acid.

The content of the dicarboxylic acid having side chains, derivative thereof or salt thereof (hereinafter referred to as "dicarboxylic acids having side chains") in the electrolytic solution is preferably from 0.1 to 35 wt-%.

More preferably, the content of dicarboxylic acids having side chains is from 0.5 to 3 wt-%, and the content of boric acid is from 5 to 40 wt-%. In this case, if the content of dicarboxylic acids having side chains deviates from the above defined range, the resulting withstand voltage is lowered. If the content of boric acid falls below the above defined range, the resulting withstand voltage is lowered. On the other hand, if the content of boric acid exceeds the above defined range, the resulting tan $\delta$ value is raised.

Even more preferably, the content of dicarboxylic acids having side chains is from 5 to 25 wt-%, and the content of boric acid is from 0.1 to 5 wt-%. In this case, if the content of dicarboxylic acids having side chains falls below the above defined range, the resulting tan $\delta$ value is raised. On the contrary, if the content of dicarboxylic acids having side chains exceeds the above defined range, the resulting withstand voltage is lowered. If the content of boric acid falls below the above defined range, the resulting withstand voltage is lowered. On the other hand, if the content of boric acid exceeds the above defined range, the resulting tan $\delta$ value is raised.

The second embodiment of the electrolytic solution of the present invention comprises a $C_{6-10}$ straight-chain aliphatic dicarboxylic acid, aromatic monocarboxylic acid or salt thereof incorporated therein in addition to boric acid. Examples of the $C_{6-10}$ straight-chain aliphatic dicarboxylic acid include adipic acid, pimelic acid, suberic acid, azelaic acid, and sebacic acid. Examples of the aromatic monocarboxylic acid include benzoic acid, and toluic acid.

If the straight-chain aliphatic dicarboxylic acid has less than 6 carbon atoms, the resulting withstand voltage is lowered. On the contrary, if the straight-chain aliphatic dicarboxylic acid has more than 11 carbon atoms, the resulting tan $\delta$ value is raised. Further, if the electrolytic solution comprises an aromatic dicarboxylic acid incorporated therein, the resulting withstand voltage is lowered.

The content of the $C_{6-10}$ straight-chain aliphatic dicarboxylic acid, aromatic monocarboxylic acid or salt thereof (hereinafter referred to as "straight-chain aliphatic dicarboxylic acids") is preferably from 0.1 to 35 wt-%. If the content of straight-chain aliphatic dicarboxylic acids falls below 0.1 wt-%, the resulting tan $\delta$ value is raised. On the contrary, if the content of straight-chain aliphatic dicarboxylic acids exceeds 35 wt-%, the resulting withstand voltage is lowered.

Examples of the salt of $C_{6-10}$ straight-chain aliphatic dicarboxylic acid or aromatic monocarboxylic acid include ammonium salt of these acids, amine salt of these acids, quaternary ammonium salt of these acids, and cyclic amidine compound quaternary salt of these acids. Examples of amines constituting the amine salt include primary amine such as methylamine, ethylamine, propylamine, butylamine and ethylenediamine, secondary amine such as dimethylamine, diethylamine, dipropylamine, methylethylamine and diphenylamine, and tertiary amine such as trimethylamine, triethylamine, tripropylamine, triphenylamine and 1,8-diazabicyclo(5,4,0)-undecene-7. Examples of quaternary ammonium constituting the quaternary ammonium salt include tetraalkylammonium such as tetramethylammonium, tetraethylammonium, tetrapropylammonium, tetrabutylammonium, methyl triethylammonium and dimethyl diethylammonium, and pyridium such as 1-methylpyridium, 1-ethylpyridium, and 1,3-diethylpyridium. Examples of cations constituting the cyclic amidine compound quaternary salt include cations formed by quaterizing the following compounds. Imidazole monocyclic compounds (e.g., imidazole homologs such as 1-methylimidazole, 1,2-dimethylimidazole, 1,4-dimethyl-2-ethylimidazole and 1-phenylimidazole, oxyalkyl derivatives such as 1-methyl-2-oxymethylimidazole and 1-methyl-2-oxyethylimidazole, nitro and amino derivatives such as 1-methyl-4(5)-nitroimidazole and 1,2-dimethyl-5(4)-aminoimidazole), benzoimidazole (e.g., 1-methylbenzoimidazole, 1-methyl-2-benzylbenzoimidazole), compounds having 2-imidazoline ring (e.g., 1-methylimidazoline, 1,2-dimethylimidazoline, 1,2,4-trimethylimidazoline, 1,4-dimethyl-2-ethylimidazoline, 1-methyl-2-phenylimidazoline), compounds having tetrahydropyrimine ring (e.g., 1-methyl-1,4,5,6-tetrahydropyrimidine, 1,2-dimethyl-1,4,5,6- tetrahydropyrimidine, 1,8-diazabicyclo[5.4.0]undecene-7,1,5-diazabicyclo[4.3.0]nonene-5)

Examples of the solvent to be used herein include protonic organic polar solvents such as monovalent alcohol (e.g., ethanol, propanol, butanol, pentanol, hexanol, cyclobutanol, cyclopentanol, cyclohexanol, benzyl alcohol), polyvalent alcohol and oxyalcohol compound (e.g., ethylene glycol, propylene glycol, glycerin, methyl cellolsolve, ethyl cellosolve, methoxy propylene glycol, dimethoxy propanol), and aprotic organic polar solvents such as amide (e.g., N-methylformamide, N,N-dimethylformamide, N-ethylformamide, N,N-diethylformamide, N-methylacetamide, N,N-dimethylacetamide, N-ethylacetamide, N,N-diethylacetamide, hexamethylphosphoric amide), lactone (e.g., γ-butyrolactone, δ-valerolactone, γ-valerolactone), cyclic amide (e.g., N-methyl-2-pyrrolidone, ethylene carbonate, propylene carbonate, isobutylene carbonate), nitrile (e.g., acetonitrile), oxide (e.g., dimethyl sulfoxide) and 2-imidazolidinone [e.g., 1, 3-dialkyl-2-imidazolidinone such as 1,3-dimethyl-2-imidazolidinone, 1,3-diethyl-2-imidazolidinone and 1,3-di (n-propyl)-2-imidazolidinone, 1,3,4-trialkyl-2-imidazolidinone such as 1,3,4-trimethyl-2-imidazolidinone].

The electrolytic solution for electrolytic capacitor according to the present invention can comprise a boric compound such as boric acid, complex compound of boric acid with a polysaccharide (e.g., mannitol, sorbitol) and complex compound of boric acid with a polyvalent alcohol (e.g., ethylene glycol, glycerin), a surface active agent, colloidal silica, etc. incorporated therein to further enhance the withstand voltage. However, PVA is not incorporated in the electrolytic solution in the present invention.

The electrolytic solution of the present invention may comprise various additives incorporated therein for the purpose of lessening leakage current or absorbing hydrogen gas. Examples of these additives include aromatic nitro compounds (e.g., p-nitrobenzoic acid, p-nitrophenol), phosphorus compounds (e.g., phosphoric acid, phosphorous acid, polyphosphoric acid, acidic phosphoric acid ester compound), and oxycarboxylic acid compounds.

In the electrolytic capacitor according to the first to third aspects of the present invention, an electrolytic solution containing dicarboxylic acids having side chains and boric acid, i.e., first embodiment of the electrolytic solution according to the present invention, if used, exhibits a high sparking voltage and a high electrical conductivity. The resulting synergistic effect makes it possible to obtain an electrolytic capacitor having a higher withstand voltage and overvoltage resistance without impairing the dielectric loss.

In the electrolytic capacitor according to the first to third aspects of the present invention, an electrolytic solution containing straight-chain aliphatic dicarboxylic acids having side chains and boric acid, i.e., second embodiment of the electrolytic solution according to the present invention, if used, exhibits a high electrical conductivity. The resulting synergistic effect makes it possible to obtain an electrolytic capacitor having a high withstand voltage suitable for use in middle and high voltage and a low dielectric loss.

The present invention will be further described in the following examples. Unless otherwise indicated, all the parts are by weight.

Firstly, embodiments of the electrolytic capacitor according to the first aspect of the present invention comprising a PVA-coated separator and an anode foil having pits with a diameter of not less than 0.1 μm formed thereon will be described.

EXAMPLE 1

An aqueous solution having PVA (saponification degree: 99 mol-%; polymerization degree: 1,700) dissolved therein in an amount of 5% was applied to a separator (manila paper; density: 0.25 g/cm$^3$; thickness: 40 μm), and then heated and dried to obtain a separator having PVA attached thereto. The attached amount of PVA was 10 g/m$^2$. A cathode foil and an anode foil which has pits with a diameter of not less than 0.1 μm formed thereon were wound with the separator provided interposed therebetween to prepare a 400 V-10 μF capacitor element. Separately, an electrolytic solution comprising 100 parts of ethylene glycol and 15 parts of ammonium 1,6-decanedicarboxylate was prepared. The capacitor element thus prepared was impregnated with the electrolytic solution, and then inserted into an aluminum case which was then hermetically sealed with a rubber member. Subsequently, 425 V was applied to the electrolytic capacitor at a temperature of 105° C. for 3 hours so that the electrolytic capacitor was subjected to reformation. At the same time, the electrolytic solution was gelled. Thus, an aluminum electrolytic capacitor was prepared.

EXAMPLE 2

An aluminum electrolytic capacitor was prepared in the same manner as in Example 1 except that as the separator there was used a kraft paper having a density of 0.60 g/cm$^3$ and a thickness of 20 μm.

EXAMPLE 3

An aluminum electrolytic capacitor was prepared in the same manner as in Example 1 except that as the electrolytic solution there was used one comprising 100 parts of ethylene glycol, 15 parts of ammonium 1,6-decanedicarboxylate and 3 parts of boric acid.

EXAMPLE 4

An aluminum electrolytic capacitor was prepared in the same manner as in Example 2 except that the amount of PVA attached to the separator was 0.05 g/m$^2$.

COMPARATIVE EXAMPLE 1

A cathode foil and an anode foil which has pits with a diameter of not less than 0.1 μm formed thereon were wound with a separator (kraft paper; density: 0.60 g/cm$^3$; thickness: 40 μm) provided interposed therebetween to prepare a 400 V-10 μF capacitor element. Separately, an electrolytic solution comprising 100 parts of ethylene glycol and 15 parts of ammonium 1,6-decanedicarboxylate was prepared. The capacitor element thus prepared was impregnated with the electrolytic solution, and then inserted into an aluminum case which was then hermetically sealed with a rubber member. Subsequently, 425 V was applied to the electrolytic capacitor at a temperature of 105° C. for 3 hours so that the electrolytic capacitor was subjected to reformation. Thus, an aluminum electrolytic capacitor was prepared.

COMPARATIVE EXAMPLE 2

An aluminum electrolytic capacitor was prepared in the same manner as in Comparative Example 1 except that as the separator there was used a kraft paper having a density of 0.60 g/cm$^3$ and a thickness of 20 μm.

COMPARATIVE EXAMPLE 3

An aluminum electrolytic capacitor was prepared in the same manner as in Comparative Example 1 except that as the separator there was used a manila paper having a density of 0.25 g/cm$^3$ and a thickness of 40 μm.

COMPARATIVE EXAMPLE 4

An aluminum electrolytic capacitor was prepared in the same manner as in Example 1 except that as the anode foil there was used one having pits with a diameter of less than 0.1 μm formed thereon.

COMPARATIVE EXAMPLE 5

An aluminum electrolytic capacitor was prepared in the same manner as in Comparative Example 3 except that the capacitor element was impregnated with an electrolytic solution comprising 100 parts of ethylene glycol, 15 parts of ammonium 1, 6-decanedicarboxylate and 11 parts of PVA (saponification degree: 99 mol-%; polymerization degree: 1,700), inserted into an aluminum case which was then hermetically sealed, and then subjected to reformation at 425 V and 105° C. for 3 hours while the electrolytic solution was being gelled.

These aluminum electrolytic capacitors were each then subjected to high-temperature load test at 400 V and 105° C. for 2,000 hours. The results of the test are set forth in Table 1. For the test, 20 pieces of the electrolytic capacitor were used for each example. In order to determine various properties, the values were averaged over 20 pieces.

TABLE 1

|  | Initial properties | | After 105° C.–2000 hrs. | |
| --- | --- | --- | --- | --- |
|  | Capacitance (μF) | tanδ | % Capacitance change | tanδ |
| Example 1 | 10.01 | 0.02 | −0.1 | 0.02 |
| Example 2 | 10.05 | 0.04 | −0.1 | 0.04 |
| Example 3 | 10.08 | 0.02 | 0.1 | 0.02 |
| Example 4 | 10.00 | 0.05 | −0.1 | 0.06 |
| Comparative Example 1 | 10.01 | 0.05 | −0.2 | 0.07 |
| Comparative Example 2 | 10.01 | 0.04 | −0.4 | 0.07 |
| Comparative Example 3 | Shortcircuited during reformation | — | — | — |
| Comparative Example 4 | 2.15 | 0.09 | — | — |
| Comparative Example 5 | 1.08 | 0.45 | — | — |

Table 1 shows that the prior art aluminum electrolytic capacitor of Comparative Example 3 comprising a low density separator shows shortcircuiting during reformation while the aluminum electrolytic capacitors of Examples 1 and 3 comprising a low density (0.25 g/cm$^3$) separator show no problems in initial properties and life properties. In other words, the electrolytic capacitors according to the present invention exhibit an improved withstand voltage, making it possible to use a low separator. The use of such a low density separator makes it possible to reduce tan δ from that of Example 2 comprising a separator having a usual density (0.60 g/cm$^3$) as shown in Examples 1 and 3.

Comparative Example 4 comprising an anode foil having pits with a diameter of less than 0.1 μm formed thereon and Comparative Example 5 involving the impregnation of the capacitor element with an electrolytic solution containing PVA which is then gelled after capacitor assembly exhibit a low initial capacitance and a high tan δ value and thus cannot provide normal aluminum electrolytic capacitor properties.

Subsequently, the aluminum electrolytic capacitors of Examples 1 to 4 and Comparative Examples 1 and 2 were subjected to overvoltage test at 480 V and 500 V at a temperature of 105° C. for 100 hours. The results are set forth in Table 2. For the overvoltage test, 20 pieces of the aluminum electrolytic capacitor were used for each example. The number of pieces showing shortcircuiting is set forth in Table 2.

TABLE 2

| Example No. | 480 V-1000 hrs Number of pieces showing shortcircuiting | 500 V-100 hrs Number of pieces showing shortcircuiting |
| --- | --- | --- |
| Example 1 | 0 | 3 |
| Example 2 | 0 | 0 |
| Example 3 | 0 | 0 |
| Example 4 | 0 | 1 |
| Comparative Example 1 | 2 | — |
| Comparative Example 2 | 4 | — |

Table 2 shows that in 480V-100 hour overvoltage test the aluminum electrolytic capacitors of Examples 1 to 4 show no shortcircuiting and exhibit an improved overvoltage resistance while the prior art aluminum electrolytic capacitor of Comparative Example 1 and the aluminum electrolytic capacitor of Comparative Example 2 comprising a thin separator (20 μm) (Comparative Example 2) show shortcircuiting. This means that a thin separator (20 μm) can be used in the electrolytic capacitor of the present invention as shown in Examples 2 and 4 to reduce the capacitor size.

In 500V-100 hour overvoltage test, the electrolytic capacitor of Example 3 comprising a low density (0.25 g/cm$^3$) separator impregnated with an electrolytic solution containing boric acid shows no shortcircuiting while the electrolytic capacitor of Example 1 comprising the same low density separator impregnated with an ordinary electrolytic solution shows shortcircuiting. This means that the incorporation of boric acid in the electrolytic solution makes it possible to further improve the overvoltage resistance.

The electrolytic capacitor of Example 2 comprising a separator having PVA attached thereto in an amount of 10 g/m$^2$ shows no shortcircuiting while the electrolytic capacitor of Example 4 comprising a separator having PVA attached thereto in an amount of 0.05 g/m$^2$ shows shortcircuiting. This means that the attached amount of PVA has an effect on the overvoltage resistance.

Embodiments of the electrolytic capacitor according to the first aspect of the present invention comprising a PVA-coated separator, an anode foil having pits with a diameter of not less than 0.1 μm formed thereon and an electrolytic solution containing dicarboxylic acids having side chains and boric acid will be described hereinafter.

EXAMPLE 5

An aqueous solution having PVA (saponification degree: 96 mol-%; polymerization degree: 1,700) dissolved therein in an amount of 20% was applied to a separator (kraft paper; density: 0.75 g/cm$^3$; thickness: 50 μm) by means of a comma reverse type coating machine, and then heated and dried to obtain a separator having PVA attached thereto. The attached amount of PVA was 5 g/m$^2$. A cathode foil and an anode foil which has pits with a diameter of not less than 0.1 μm formed thereon were then wound with the foregoing separator provided interposed therebetween to prepare a 500V-

10 μF capacitor element. Separately, an electrolytic solution comprising 100 parts of ethylene glycol, 15 parts of ammonium 1,7-octanedicarboxylate and 3.5 parts of boric acid was prepared. The capacitor element thus prepared was impregnated with the foregoing electrolytic solution, inserted into an aluminum case which was then hermetically sealed with a rubber member, and then subjected to reformation at 550 V under heating while the electrolytic solution was being gelled to prepare an aluminum electrolytic capacitor.

EXAMPLE 6

An aluminum electrolytic capacitor was prepared in the same manner as in Example 5 except that as the electrolytic solution there was used one comprising 100 parts of ethylene glycol, 15 parts of ammonium 1,6-decanedicarboxylate and 3.5 parts of boric acid.

EXAMPLE 7

An aluminum electrolytic capacitor was prepared in the same manner as in Example 5 except that as the electrolytic solution there was used one comprising 100 parts of ethylene glycol, 1 part of ammonium 1,6-decanedicarboxylate and 15 parts of boric acid.

COMPARATIVE EXAMPLE 6

An aluminum electrolytic capacitor was prepared in the same manner as in Example 5 except that as the electrolytic solution there was used one comprising 100 parts of ethylene glycol and 15 parts of ammonium 1,7-octanedicarboxylate.

COMPARATIVE EXAMPLE 7

An aluminum electrolytic capacitor was prepared in the same manner as in Example 5 except that as the electrolytic solution there was used one comprising 100 parts of ethylene glycol and 30 parts of boric acid.

COMPARATIVE EXAMPLE 8

An aluminum electrolytic capacitor was prepared in the same manner as in Example 5 except that an ordinary separator was used.

CONVENTIONAL EXAMPLE 1

An aluminum electrolytic capacitor was prepared in the same manner as in Example 5 except that an ordinary separator and an electrolytic solution comprising 100 parts of ethylene glycol, 15 parts of ammonium 1,6-decanedicarboxylate, 3.5 parts of boric acid and 3 parts of PVA were used.

The aluminum electrolytic capacitors of Examples 5 to 7, Comparative Examples 6 to 8 and Conventional Example 1 were each subjected to high-temperature load test at 500 V and 105° C. for 2,000 hours. The results are set forth in Table 3. For the high-temperature load test, 20 pieces of the electrolytic capacitor were used for each example. In order to determine various properties, the values were averaged over 20 pieces.

TABLE 3

|  | Initial properties | | After 105° C.-2000 hrs | |
| --- | --- | --- | --- | --- |
|  | Capacitance (μF) | tan δ | % Capacitance change | tan δ |
| Example 5 | 9.78 | 0.027 | −0.1 | 0.032 |
| Example 6 | 10.03 | 0.028 | −0.2 | 0.032 |
| Example 7 | 10.00 | 0.029 | −0.2 | 0.033 |
| Comparative Example 6 | Shortcircuited during reformation | | — | — |
| Comparative Example 7 | 9.77 | 0.093 | 0.3 | 0.111 |
| Comparative Example 8 | Shortcircuited during reformation | | — | — |
| Conventional Example 1 | Shortcircuited during reformation | | — | — |

Table 3 shows that the electrolytic capacitors of Examples 5 to 7 give good results both in initial properties and high-temperature load test. In other words, the synergistic effect obtained by the improvement of withstand voltage of the electrolytic capacitor of the present invention and the high sparking voltage and electrical conductivity of the electrolytic solution makes it possible to improve withstand voltage without increasing the dielectric loss. Thus, a high voltage aluminum electrolytic capacitor having a rated voltage of 500 V was realized.

For comparison, the electrolytic capacitor of Comparative Example 6 comprising an electrolytic solution free of boric acid, the electrolytic capacitor of Comparative Example 8 comprising an ordinary separator and the conventional high voltage electrolytic capacitor of Conventional Example 1 show shortcircuiting during reformation. The electrolytic capacitor of Comparative Example 7 which comprises boric acid as a main solute to provide a high withstand voltage shows no shortcircuiting during reformation and high-temperature load test but exhibits a raised tan δ value exceeding the maximum allowable range.

The aluminum electrolytic capacitors of Examples 5 to 7 were each subjected to overvoltage test at 500 V and 600 V at 105° C. for 50 hours. The results of the test are set forth in Table 4. For the overvoltage test, 20 pieces of the electrolytic capacitor were used for each example. The number of pieces showing shortcircuiting is set forth in Table 4.

TABLE 4

| Example No. | After 550 V-50 hrs Number of pieces showing shortcircuiting | After 600 V-50 hrs Number of pieces showing shortcircuiting |
| --- | --- | --- |
| Example 5 | 0 | 0 |
| Example 6 | 0 | 0 |
| Example 7 | 0 | 0 |

Table 4 shows that the electrolytic capacitors of Examples 5 to 7 show no shortcircuiting during 550 V and 600 V overvoltage tests and thus exhibit a good overvoltage resistance.

Embodiments of the electrolytic capacitor according to the second aspect of the present invention comprising a separator having PVA fibers mixed therein and an electrolytic solution containing dicarboxylic acids having side chains and boric acid will be described hereinafter.

EXAMPLE 8

An aqueous solution having PVA (saponification degree: 80 mol-%; polymerization degree: 1,700) dissolved therein in an amount of 35% was extruded into hot air through a spinneret to form a filament which was then wound to prepare a PVA fiber. Subsequently, a hemp pulp was subjected to disaggregation, dusting and dehydration, and then beaten. The hemp pulp thus treated was then mixed with the foregoing PVA fiber at a ratio of 80:20. The mixture was then subjected to paper making by means of a cylinder paper machine to prepare an electrolytic paper. The electrolytic paper thus prepared was then cut to provide a separator. A cathode foil and an anode foil which has pits with a diameter of not less than 0.1 $\mu$m formed thereon and has a withstand voltage of 650 V were wound with the foregoing separator provided interposed therebetween to prepare a 500 V-10 $\mu$F capacitor element. Subsequently, an electrolytic solution comprising 100 parts of ethylene glycol, 15 parts of ammonium 1,7-octanedicarboxylate and 3 parts of boric acid was prepared. The capacitor element thus prepared was impregnated with the foregoing electrolytic solution, inserted into an aluminum case which was then hermetically sealed with a rubber member, and then subjected to reformation at 550 V under heating to prepare an aluminum electrolytic capacitor.

EXAMPLE 9

An aluminum electrolytic capacitor was prepared in the same manner as in Example 8 except that PVA having a saponification degree of 98 mol-% was used.

EXAMPLE 10

An aqueous solution having PVA (saponification degree: 98 mol-%; polymerization degree: 1,700) dissolved therein in an amount of 35% was extruded into hot air through a spinneret to form a filament which was then wound to prepare a PVA fiber. Subsequently, a kraft pulp was subjected to disaggregation, dusting and dehydration, and then beaten. The kraft pulp thus treated was then mixed with the foregoing PVA fiber at a ratio of 80:20. The mixture was then subjected to paper making by means of a cylinder paper machine to prepare an electrolytic paper. The electrolytic paper thus prepared was then cut to provide a separator. A cathode foil and an anode foil which has a withstand voltage of 750 V were then wound with the foregoing separator provided interposed therebetween to prepare a 500 V-10 $\mu$F capacitor element as shown in FIG. 4. Subsequently, an electrolytic solution comprising 100 parts of ethylene glycol, 15 parts of ammonium 1,7-octanedicarboxylate and 3.5 parts of boric acid was prepared. The capacitor element thus prepared was impregnated with the foregoing electrolytic solution, inserted into an aluminum case which was then hermetically sealed with a rubber member, and then subjected to reformation at 550 V under heating to prepare an aluminum electrolytic capacitor.

EXAMPLE 11

An aluminum electrolytic capacitor was prepared in the same manner as in Example 10 except that as the electrolytic solution there was used one comprising 100 parts of ethylene glycol, 15 parts of ammonium 1,6-decanedicarboxylate and 3.5 parts of boric acid.

EXAMPLE 12

An aluminum electrolytic capacitor was prepared in the same manner as in Example 10 except that as the electrolytic solution there was used one comprising 100 parts of ethylene glycol, 10 parts of boric acid and 1 part of ammonium 1,6-decanedicarboxylate into which ammonium gas had been bubbled.

COMPARATIVE EXAMPLE 9

An aluminum electrolytic capacitor was prepared in the same manner as in Example 8 except that as the fiber to be mixed in the separator there was used an ordinary vinylon. The vinylon used is called vinylon staple obtained by a process which comprises spinning a yarn from an aqueous solution of PVA in a sodium sulfate solution, and then subjecting the yarn to heat treatment, drawing and acetalation to form fibers.

COMPARATIVE EXAMPLE 10

An aluminum electrolytic capacitor was prepared in the same manner as in Example 8 except that as the fiber to be mixed in the separator there was used a fiber formed by wet spinning process. This fiber was obtained by a process which comprises spinning a yarn from an aqueous solution of PVA in a sodium sulfate solution in the same manner as vinylon staple, and then subjecting the yarn to wet heat drawing in a high temperature aqueous solution of Glauber's salt, heat drawing and heat treatment to form fibers.

COMPARATIVE EXAMPLE 11

An aluminum electrolytic capacitor was prepared in the same manner as in Example 8 except that as the fiber to be mixed in the separator there was used a fiber formed by an ordinary dry spinning process. This fiber was obtained by a process which comprises spinning a yarn from an aqueous solution of PVA in hot air, and then subjecting the yarn to dry heat drawing and heat treatment.

COMPARATIVE EXAMPLE 12

An aluminum electrolytic capacitor was prepared in the same manner as in Example 10 except that as the electrolytic solution there was used one comprising 100 parts of ethylene glycol and 15 parts of ammonium 1,7-octanedicarboxylate.

COMPARATIVE EXAMPLE 13

An aluminum electrolytic capacitor was prepared in the same manner as in Example 10 except that as the electrolytic solution there was used one comprising 100 parts of ethylene glycol and 30 parts of boric acid into which ammonia gas had been injected.

CONVENTIONAL EXAMPLE 2

An aluminum electrolytic capacitor was prepared in the same manner as in Example 8 except that as the separator there was used an ordinary hemp paper free of PVA fibers.

CONVENTIONAL EXAMPLE 3

An aluminum electrolytic capacitor was prepared in the same manner as in Example 8 except that as the separator there was used an ordinary hemp paper free of PVA fibers and PVA (saponification degree: 98.5 mol-%; polymerization degree: 330) was incorporated in the electrolytic solution in an amount of 3%.

CONVENTIONAL EXAMPLE 4

An aluminum electrolytic capacitor was prepared in the same manner as in Example 8 except that as the separator there was used an ordinary hemp paper free of PVA fibers and as the electrolytic solution there was used one comprising 100 parts of ethylene glycol and 5 parts of ammonium 1,6-decanedicarboxylate.

CONVENTIONAL EXAMPLE 5

An aluminum electrolytic capacitor was prepared in the same manner as in Example 10 except that as the separator there was used an ordinary separator and as the electrolytic solution there was used one comprising 100 parts of ethylene glycol and 5 parts of ammonium 1,6-decanedicarboxylate.

The aluminum electrolytic capacitors of Examples 8 and 9, Comparative Examples 9 to 11 and Conventional Examples 2 to 4 were each subjected to high-temperature load test at 500 V and 105° C. for 2,000 hours. The results of the high-temperature load test are set forth in Table 5. Further, the aluminum electrolytic capacitors of Examples 10 to 12, Comparative Examples 12 and 13 and Conventional Example 5 were each subjected to high-temperature load test at 500 V and 105° C. for 1,000 hours. The results of the high-temperature load test are set forth in Table 6. For these tests, 20 pieces of the electrolytic capacitor were used for each example. In order to determine various properties, the value of 20 pieces were averaged.

TABLE 5

| | Initial properties | | After 105° C.-2000 hrs | |
|---|---|---|---|---|
| | Capacitance (μF) | tan δ | % Capacitance change | tan δ |
| Example 8 | 10.05 | 0.026 | −0.1 | 0.038 |
| Example 9 | 10.01 | 0.025 | −0.1 | 0.035 |
| Comparative Example 9 | Shortcircuited during reformation | | — | — |
| Comparative Example 10 | Shortcircuited during reformation | | — | — |
| Comparative Example 11 | 10.08 | 0.026 | Shortcircuited | |
| Conventional Example 2 | Shortcircuited during reformation | | — | — |
| Conventional Example 3 | Shortcircuited during reformation | | — | — |
| Conventional Example 4 | 10.06 | 0.051 | Shortcircuited | |

TABLE 6

| | Initial properties | | After 105° C.-2000 hrs | |
|---|---|---|---|---|
| | Capacitance (μF) | tan δ | % Capacitance change | tan δ |
| Example 10 | 10.00 | 0.018 | −0.2 | 0.023 |
| Example 11 | 10.04 | 0.021 | −0.4 | 0.025 |
| Example 12 | 10.08 | 0.024 | −0.4 | 0.026 |
| Comparative Example 12 | Shortcircuited during reformation | | — | — |
| Comparative Example 13 | 9.84 | 0.091 | 0.1 | 0.103 |
| Conventional Example 5 | 9.96 | 0.085 | Short circuited | |

It can be seen in Table 5 that the electrolytic capacitor of Comparative Example 9 comprising a separator having an ordinary vinylon mixed therein and the electrolytic capacitor of Comparative Example 10 comprising a separator having a fiber formed by wet spinning process mixed therein show shortcircuiting during reformation as in Conventional Examples 2 and 3 comprising a separator made of hemp paper and thus exhibit no improvement in withstand voltage.

The electrolytic capacitor of Comparative Example 11 comprising a separator having a fiber formed by dry spinning process mixed therein and the electrolytic capacitor of Conventional Example 4 comprising an ordinary electrolytic paper and an electrolytic solution having 5 parts of 1,6-decanedicarboxylic acid incorporated therein as a solute show no shortcircuiting during reformation but show shortcircuiting during 105° C.–2000 hr load test and thus exhibit an insufficient withstand voltage.

The electrolytic capacitors of Conventional Examples 2 and 3 exhibit a reformable voltage of 400 V and 450 V, respectively, and a maximum allowable voltage of 350 V and 400 V, respectively. The electrolytic solutions of Conventional Examples 2 and 3 exhibit an electrical conductivity of 2.3 mS/cm and 2.0 mS/cm, respectively. The electrolytic capacitors which had been subjected to reformation at the respective reformation voltage exhibited a tan δ value of 0.025 and 0.030, respectively.

On the contrary, the electrolytic capacitor of Example 8 comprising a separator having PVA fiber made of PVA having a saponification degree of 80 mol-% mixed therein and the electrolytic capacitor of Example 9 comprising a separator having PVA fiber made of PVA having a saponification degree of 98 mol-% mixed therein maintain good properties even after 2,000 hours of 105° C. load test. In other words, these electrolytic capacitors exhibit a maximum allowable voltage of not less than 500 V. As compared with those of Conventional Examples 2 and 3, the electrolytic capacitors of these examples show a withstand voltage rise of not less than 100 V. In Example 8, a voltage was applied at a constant current. As a result, it was found that the voltage reached 650 V, which is the withstand voltage of the anode foil. As mentioned above, the electrolytic capacitors of the present invention exhibit a drastically increased withstand voltage.

The initial tan δ value of these electrolytic capacitors remain the same as that of the electrolytic capacitor of Conventional Example 2 comprising an ordinary electrolytic paper and an ordinary electrolytic solution and are lower than that of the electrolytic capacitor of Conventional Example 3 comprising an ordinary electrolytic paper and an electrolytic solution comprising PVA dissolved therein. Further, the initial tan δ value of these electrolytic capacitors are each about half that of the electrolytic capacitor of Conventional Example 4 comprising 5 parts of 1, 6-decanedicarboxylic acid as a solute. Thus, the electrolytic capacitors according to the present invention remain the same as the conventional middle and high voltage electrolytic capacitors in dielectric loss.

It can be seen in Table 6 that the electrolytic capacitor of Comparative Example 12 comprising an electrolytic solution free of boric acid shows shortcircuiting during reformation and the electrolytic capacitor of Conventional Example 5 comprising an ordinary separator and an electrolytic solution containing 1, 6-decanedicarboxylic acid as a solute shows shortcircuiting during the high-temperature load test. Thus, these examples cannot provide a withstand voltage that allows the preparation of an electrolytic capacitor having a rated voltage of 500 V. The electrolytic capacitor of Comparative Example 13 comprising boric acid alone as a solute exhibits a raised tan δ value at the initial stage and after 2,000 hours of high temperature load. On the contrary, the initial tan δ value of the electrolytic capacitors of Examples 10 to 12 are each about ⅕ to ½ of that of the electrolytic capacitors of Comparative Example 3 and Conventional Example 5. The electrolytic capacitors of Examples 10 to 12 show little change in tan δ even after 2,000 hours of 105° C. load test. Thus, the synergistic effect obtained by the high withstand voltage of the electrolytic capacitor of the present invention and the electrolytic solution having a high sparking voltage and electrical conductivity makes it possible to obtain a high withstand voltage while maintaining a low dielectric loss and hence realize an electrolytic capacitor having a rated voltage of 500 V.

Subsequently, the aluminum electrolytic capacitors of Examples 8 to 12 and Comparative Example 11 were each subjected to overvoltage test at 550 V and 600 V at 105° C. for 50 hours. The results of the test are set forth in Table 7. For this test, 20 pieces of the electrolytic capacitor were used for each example. The number of pieces showing shortcircuiting is set forth in Table 7.

TABLE 7

| Example No. | After 550 V-50 hrs Number of pieces showing shortcircuiting | After 600 V-50 hrs Number of pieces showing shortcircuiting |
| --- | --- | --- |
| Example 8 | 0 | 2 |
| Example 9 | 0 | 0 |
| Example 10 | 0 | 0 |
| Example 11 | 0 | 0 |
| Example 12 | 0 | 0 |
| Comparative Example 11 | 20 | — |

It can be seen in Table 7 that all the pieces of the electrolytic capacitor of Comparative Example 11 comprising a separator having a fiber formed by ordinary dry spinning method mixed therein show shortcircuiting during 550 V-50 hr overvoltage test. On the contrary, the electrolytic capacitor of Example 8 comprising a separator having a PVA fiber of the present invention of PVA having a saponification degree of 80 mol-% mixed therein and the electrolytic capacitors of Examples 9 to 12 comprising a separator having a PVA fiber of the present invention of PVA having a saponification degree of 98 mol-% mixed therein show no shortcircuiting and thus exhibit a good overvoltage resistance. Further, the electrolytic capacitors of Examples 9 to 12 comprising PVA having a saponification degree of 98 mol-% show no shortcircuiting even after 50 hours of 600 V load and thus exhibit an even higher overvoltage resistance.

Embodiments of the electrolytic capacitor according to the third aspect of the present invention comprising PVA attached to both end faces of the capacitor element and an electrolytic solution containing dicarboxylic acids having side chains and boric acid will be described hereinafter.

EXAMPLE 13

As shown in FIG. 4, an anode foil 14 having an oxide layer formed on the surface of a roughened aluminum foil and a cathode foil 15 made of aluminum were wound with a separator 16 made of paper or the like provided interposed therebetween to prepare a capacitor element 1. The capacitor element 1 was then impregnated with a driving electrolytic solution comprising 100 parts of ethylene glycol, 15 parts of ammonium 1,7-octanedicarboxylate and 3 parts of boric acid. 1. A PVA powder was then attached to the end faces 12 and 13 of the capacitor element as shown in FIG. 1. The capacitor element thus prepared was inserted into a closed-end cylindrical outer case 2 which was then hermetically sealed with a sealing member, subjected to heat treatment at 85° C., and then subjected to reformation at 550 V to prepare an aluminum electrolytic capacitor. The rated voltage and capacitance of the aluminum electrolytic capacitor thus prepared were 500 V and 10 μF, respectively.

EXAMPLE 14

In Example 13, a PVA powder was attached to both end faces 12 and 13 of a capacitor element impregnated with an electrolytic solution. In the present example, PVA was attached to only the end face 12 of a capacitor element impregnated with an electrolytic solution. The electrolytic capacitor was then subjected to heat treatment in such an arrangement that it was positioned as shown in FIG. 2.

EXAMPLE 15

In Example 13, a PVA powder was attached to both end faces 12 and 13 of a capacitor element impregnated with an electrolytic solution. In the present example, PVA was placed on the inner bottom 21 of the outer case to prepare an aluminum electrolytic capacitor. Heat treatment was effected in such an arrangement that the bottom of the capacitor faces upward, i.e., the position of the capacitor is reversed from that of FIG. 3.

COMPARATIVE EXAMPLE 14

An aluminum electrolytic capacitor was prepared in the same manner as in Example 13 except that as the electrolytic solution there was used one comprising 100 parts of ethylene glycol and 15 parts of ammonium 1,7-octanedicarboxylic acid.

CONVENTIONAL EXAMPLE 6

An aluminum electrolytic capacitor was prepared in the same manner as in Example 13 except that no PVA was used.

These aluminum electrolytic capacitors were then subjected to high-temperature load test. The load test was conducted at an applied voltage of 500 V and a temperature of 105° C. for 1,000 hours. The results of the load test are set forth in Table 8.

TABLE 8

|  | Initial properties | | After 105° C.-1000 hrs | |
| --- | --- | --- | --- | --- |
|  | Capacitance (μF) | tan δ | % Capacitance change | tan δ |
| Example 13 | 9.82 | 0.025 | −0.2 | 0.036 |
| Example 14 | 9.76 | 0.024 | −0.2 | 0.036 |
| Example 15 | 9.91 | 0.024 | −0.4 | 0.037 |
| Comparative Example 14 | Shortcircuited during reformation | | — | — |
| Conventional Example 6 | Shortcircuited during reformation | | — | — |

It can be seen in Table 8 that the electrolytic capacitor of Conventional Example 6 shows shortcircuiting during reformation and the electrolytic capacitor of Comparative Example 14 comprising an electrolytic solution free of boric acid shows shortcircuiting during reformation and thus exhibits no improvement of withstand voltage. On the contrary, the electrolytic capacitors of Examples 13 to 15 maintain good properties even after 2,000 hours of 105° C. load. In other words, by the synergistic effect obtained by the improvement of withstand voltage and the high sparking voltage and electrical conductivity of the electrolytic solution, the electrolytic capacitors of the present invention exhibit a high withstand voltage while maintaining a low dielectric loss. Thus, electrolytic capacitors having a rated voltage of 500 V can be realized.

Subsequently, the aluminum electrolytic capacitors of Examples 13 to 15 were each subjected to overvoltage test at 550 V and 600 V at 105° C. for 50 hours. The results of the test are set forth in Table 9.

TABLE 9

| Example No. | After 550 V-50 hrs Number of pieces showing shortcircuiting | After 600 V-50 hrs Number of pieces showing shortcircuiting |
|---|---|---|
| Example 13 | 0 | 0 |
| Example 14 | 0 | 0 |
| Example 15 | 0 | 0 |

It can be seen in Table 9 that the electrolytic capacitors of Examples 13 to 15 show no shortcircuiting during overvoltage test and thus exhibit a good overvoltage resistance.

Embodiments of the electrolytic capacitor according to the first to third aspects of the present invention comprising an electrolytic solution containing straight-chain dicarboxylic acids and boric acid will be described hereinafter.

EXAMPLE 16

An aqueous solution having PVA (saponification degree: 98 mol-%; polymerization degree: 1,700) dissolved therein in an amount of 35% was extruded into hot air through a spinneret to form a filament which was then wound to prepare a PVA fiber. Subsequently, a kraft pulp was subjected to disaggregation, dusting and dehydration, and then beaten. The kraft pulp thus treated was then mixed with the foregoing PVA fiber at a ratio of 80:20. The mixture was then subjected to paper making by means of a cylinder paper machine to prepare an electrolytic paper. The electrolytic paper thus prepared was then cut to provide a separator. A cathode foil and an anode foil which has a withstand voltage of 650 V were then wound with the foregoing separator provided interposed therebetween to prepare a capacitor element as shown in FIG. 4. Subsequently, an electrolytic solution comprising 100 parts of ethylene glycol, 10 parts of ammonium adipate and 3 parts of boric acid was prepared. The capacitor element thus prepared was impregnated with the foregoing electrolytic solution, inserted into an aluminum case which was then hermetically sealed with a rubber member, and then subjected to reformation at 450 V under heating to prepare an aluminum electrolytic capacitor having a rated voltage of 400 V and a rated capacitance of 10 $\mu$F.

EXAMPLE 17

As shown in FIG. 4, an anode foil 14 having an oxide layer formed on the surface of a roughened aluminum foil and a cathode foil 15 made of aluminum were wound with a separator 12 made of paper or the like provided interposed therebetween to prepare a capacitor element 1. The capacitor element 1 was then impregnated with a driving electrolytic solution comprising 100 parts of ethylene glycol, 10 parts of ammonium adipate and 3 parts of boric acid. A PVA powder was then applied to the end faces 12 and 13 of the capacitor element to form a PVA layer thereof as shown in FIG. 1. The capacitor element thus prepared was inserted into a closed-end cylindrical outer case 2 which was then hermetically sealed with a sealing member, heated, and then subjected to reformation at 450 V to prepare an aluminum electrolytic capacitor. The rated voltage and capacitance of the aluminum electrolytic capacitor thus prepared were 400 V and 10 $\mu$F, respectively.

EXAMPLE 18

An aqueous solution having PVA (saponification degree: 96 mol-%; polymerization degree: 1,700) dissolved therein in an amount of 20% was applied to a separator (kraft paper; density: 0.75 g/cm$^3$; thickness: 50 $\mu$m) by means of a comma reverse type coating machine, and then heated and dried to obtain a separator having PVA attached thereto. The attached amount of PVA was 5 g/m$^2$. A cathode foil and an anode foil which has pits with a diameter of not less than 0.1 $\mu$m formed thereon were then wound with the foregoing separator provided interposed therebetween to prepare a 400V-10 $\mu$F capacitor element. Separately, an electrolytic solution comprising 100 parts of ethylene glycol, 10 parts of ammonium adipate and 3 parts of boric acid was prepared. The capacitor element thus prepared was impregnated with the foregoing electrolytic solution, inserted into an aluminum case which was then hermetically sealed with a rubber member, and then subjected to reformation at 450 V under heating while the electrolytic solution was being gelled to prepare an aluminum electrolytic capacitor.

COMPARATIVE EXAMPLE 15

An aluminum electrolytic capacitor was prepared in the same manner as in Example 16 except that as the electrolytic solution there was used one comprising 100 parts of ethylene glycol and 10 parts of ammonium adipate.

COMPARATIVE EXAMPLE 16

An aluminum electrolytic capacitor was prepared in the same manner as in Example 16 except that an ordinary separator was used.

COMPARATIVE EXAMPLE 17

An aluminum electrolytic capacitor was prepared in the same manner as in Example 18 except that as the electrolytic solution there was used one comprising 100 parts of ethylene glycol and 10 parts of ammonium adipate.

COMPARATIVE EXAMPLE 18

An aluminum electrolytic capacitor was prepared in the same manner as in Example 18 except that an ordinary separator was used.

CONVENTIONAL EXAMPLE 7

An aluminum electrolytic capacitor was prepared in the same manner as in Example 16 except that as the separator there was used an ordinary separator and as the electrolytic solution there was used one comprising 100 parts of ethylene glycol and 15 parts of ammonium 1,7-octanedicarboxylate.

CONVENTIONAL EXAMPLE 8

An aluminum electrolytic capacitor was prepared in the same manner as in Example 18 except that as the separator there was used an ordinary separator and as the electrolytic solution there was used one comprising 100 parts of ethylene glycol, 15 parts of ammonium 1,7-octanedicarboxylate, 3.5 parts of boric acid and 3 parts of PVA.

These aluminum electrolytic capacitors were each subjected to high-temperature load test. The load test was effected at an applied voltage of 400 V at 105° C. for 1,000 hours for Examples 16 and 17, Comparative Examples 15 and 16 and Conventional Example 7. The results of the test are set forth in Table 10. For Example 18, Comparative Examples 17 and 18 and Conventional Example 8, the load test was conducted at an applied voltage of 400 V at 105° C. for 2,000 hours. The results of the test are set forth in Table 11. For this test, 20 pieces of the electrolytic capacitor were used for each example. In order to determine various properties, the values of 20 pieces were averaged.

TABLE 10

|  | Initial properties | | After 105° C.-1000 hrs | |
|---|---|---|---|---|
|  | Capacitance ($\mu$F) | tan δ | % Capacitance change | tan δ |
| Example 16 | 10.35 | 0.013 | −2.5 | 0.017 |
| Example 17 | 10.24 | 0.015 | −2.4 | 0.018 |
| Comparative Example 15 | Shortcircuited during reformation | | — | — |
| Comparative Example 16 | Shortcircuited during reformation | | — | — |
| Conventional Example 7 | 10.03 | 0.025 | −1.5 | 0.030 |

TABLE 11

|  | Initial properties | | After 105° C.-2000 hrs | |
|---|---|---|---|---|
|  | Capacitance ($\mu$F) | tan δ | % Capacitance change | tan δ |
| Example 18 | 10.18 | 0.015 | −2.4 | 0.018 |
| Comparative Example 17 | Shortcircuited during reformation | | — | — |
| Comparative Example 18 | Shortcircuited during reformation | | — | — |
| Conventional Example 8 | 10.11 | 0.033 | −1.9 | 0.036 |

It can be seen in Table 10 that the electrolytic capacitor of Comparative Example 15 comprising an electrolytic solution free of boric acid and the electrolytic capacitor of Comparative Example 16 comprising an ordinary separator show shortcircuiting during reformation. Thus, these examples cannot provide a withstand voltage that allows the preparation of an electrolytic capacitor having a rated voltage of 400 V. The electrolytic capacitor of Conventional Example 7 comprising an electrolytic solution containing boric acid which is an electrolytic solution for conventional 400 V electrolytic capacitor using ammonium 1,7-octanedicarboxylate exhibits a high tan δ value at the initial stage and after high-temperature load test. On the contrary, the tan δ value of the electrolytic capacitors of Examples 16 and 17 are about half that of the conventional example at the initial stage and after the load test. Thus, these electrolytic capacitors exhibit a reduced dielectric loss.

It can be seen in Table 11 that the electrolytic capacitor of Comparative Example 17 comprising an electrolytic solution free of boric acid and the electrolytic capacitor of Comparative Example 18 comprising an ordinary separator show shortcircuiting during reformation. On the contrary, the tan δ value of the electrolytic capacitor of Example 18 is about half that of Conventional Example 8 at the initial stage and after the high-temperature load test. In other words, the synergistic effect obtained by the improvement of withstand voltage of the electrolytic capacitor of the present invention and the high electrical conductivity of the electrolytic solution makes it possible to obtain a 400 V aluminum electrolytic capacitor having a low dielectric loss.

In order to evaluate overvoltage resistance, 20 pieces of aluminum electrolytic capacitor were prepared for each of Examples 16 to 18 and Conventional Examples 7 and 8. The overvoltage test was conducted at an applied voltage of 450 V and 500 V at 105° C. for 50 hours. The results of the test are set forth in Table 12.

TABLE 12

| Example No. | After 450 V-50 hrs Number of pieces showing shortcircuiting | After 500 V-50 hrs Number of pieces showing shortcircuiting |
|---|---|---|
| Example 16 | 0 | 0 |
| Example 17 | 0 | 0 |
| Example 18 | 0 | 0 |
| Conventional Example 7 | 3 | 8 |
| Conventional Example 8 | 3 | 20 |

It can be seen in Table 12 that the electrolytic capacitors of Examples 16 to 18 show no shortcircuiting during 450 V-50 hour and 500 V-50 hour overvoltage tests while the electrolytic capacitor of Conventional Example 7 shows shortcircuiting during these overvoltage tests. Thus, the electrolytic capacitors of the present invention exhibit an improved overvoltage resistance.

Embodiments of the electrolytic capacitor according to the first and second aspects of the present invention comprising an electrolytic solution containing other straight-chain dicarboxylic acids and boric acid will be described hereinafter.

EXAMPLE 19

An aluminum electrolytic capacitor having a rated voltage of 450 V and a rated capacitance of 10 $\mu$m was prepared in the same manner as in Example 16 except that as the anode foil there was used one having a withstand voltage of 700 V, as the electrolytic solution there was used one comprising 100 parts of ethylene glycol, 10 parts of ammonium benzoate and 3 parts of boric acid, and the electrolytic capacitor was subjected to reformation at 500 V.

EXAMPLE 20

An aluminum electrolytic capacitor was prepared in the same manner as in Example 18 except that a 450 V-10 $\mu$F capacitor element was used, an electrolytic solution comprising 100 parts of ethylene glycol, 10 parts of ammonium benzoate and 3 parts of boric acid was used, and the electrolytic capacitor was subjected to reformation at 500 V.

COMPARATIVE EXAMPLE 19

An aluminum electrolytic capacitor was prepared in the same manner as in Example 19 except that as the electrolytic solution there was used one comprising 100 parts of ethylene glycol and 10 parts of ammonium benzoate.

COMPARATIVE EXAMPLE 20

An aluminum electrolytic capacitor was prepared in the same manner as in Example 19 except that an ordinary separator was used.

COMPARATIVE EXAMPLE 21

An aluminum electrolytic capacitor was prepared in the same manner as in Example 20 except that an ordinary separator was used.

CONVENTIONAL EXAMPLE 9

An aluminum electrolytic capacitor was prepared in the same manner as in Example 19 except that as the separator there was used an ordinary separator and as the electrolytic solution there was used one comprising 100 parts of ethylene glycol, 15 parts of ammonium 1,6-decanedicarboxylate and 3 parts of boric acid.

CONVENTIONAL EXAMPLE 10

An aluminum electrolytic capacitor was prepared in the same manner as in Example 20 except that as the separator there was used an ordinary separator and as the electrolytic solution there was used one comprising 100 parts of ethylene glycol, 15 parts of ammonium 1,6-octanedicarboxylate, 10 parts of boric acid and 3 parts of PVA.

These aluminum electrolytic capacitors were each then subjected to high-temperature load test. The load test was effected at an applied voltage of 450 V at 105° C. for 1,000 hours for Example 19, Comparative Examples 19 and 20 and Conventional Example 9. For Example 20, Comparative Example 21 and Conventional Example 10, the load test was conducted at an applied voltage of 450 V at 105° C. for 2,000 hours. The results of the test are set forth in Tables 13 and 14.

TABLE 13

| | Initial properties | | After 105° C.-1000 hrs | |
|---|---|---|---|---|
| Example No. | Capacitance ($\mu$F) | tan $\delta$ | % Capacitance change | tan $\delta$ |
| Example 19 | 10.21 | 0.010 | −2.3 | 0.015 |
| Comparative Example 19 | Shortcircuited during reformation | | — | — |
| Comparative Example 20 | Shortcircuited during reformation | | — | — |
| Conventional Example 9 | 10.01 | 0.029 | −1.8 | 0.031 |

TABLE 14

| | Initial properties | | After 105° C.-2000 hrs | |
|---|---|---|---|---|
| Example No. | Capacitance ($\mu$F) | tan $\delta$ | % Capacitance change | tan $\delta$ |
| Example 20 | 10.33 | 0.017 | 0.1 | 0.021 |
| Comparative Example 21 | Shortcircuited during reformation | | — | — |
| Conventional Example 10 | 10.00 | 0.040 | −2.1 | 0.044 |

It can be seen in Table 13 that the electrolytic capacitor of Comparative Example 19 comprising an electrolytic solution free of boric acid and the electrolytic capacitor of Comparative Example 20 comprising an ordinary separator show shortcircuiting during reformation. Thus, these examples cannot provide a withstand voltage that allows the preparation of an electrolytic capacitor having a rated voltage of 450 V. The electrolytic capacitor of Conventional Example 9 comprising an electrolytic solution containing 1,6-decanedicarboxylic acid which is an electrolytic solution for conventional 450 V electrolytic capacitor exhibits a high tan $\delta$ value at the initial stage and after high-temperature load test. On the contrary, the tan $\delta$ value of the electrolytic capacitor of Example 19 is about one third of that of Conventional Example 9 at the initial stage and after the load test.

It can be seen in Table 14 that the electrolytic capacitor of Comparative Example 21 comprising an ordinary separator shows shortcircuiting during reformation, demonstrating the effect of the separator of the present invention. The tan $\delta$ value of the electrolytic capacitor of Example 20 is half that of the electrolytic capacitor of Conventional Example 10 at the initial stage and after high-temperature load test. Thus, the electrolytic capacitor of Example 20 is an aluminum electrolytic capacitor having a low dielectric loss. As mentioned above, the synergistic effect obtained by the improvement of withstand voltage of the present invention and the high electrical conductivity of the electrolytic solution makes it possible to realize an aluminum electrolytic capacitor for middle and high voltage having an unprecedentedly low dielectric loss, i.e., tan $\delta$ value reduced to ⅓ to ½ of the conventional example.

In order to evaluate overvoltage resistance, 20 pieces of aluminum electrolytic capacitor were prepared for each of Examples 19 and 20 and Conventional Examples 9 and 10. The overvoltage test was conducted at an applied voltage of 500 V and 550 V at 105° C. for 50 hours. The results of the test are set forth in Table 15.

TABLE 15

| Example No. | After 500 V-50 hrs Number of pieces showing shortcircuiting | After 550 V-50 hrs Number of pieces showing shortcircuiting |
|---|---|---|
| Example 19 | 0 | 0 |
| Example 20 | 0 | 0 |
| Conventional Example 9 | 4 | 10 |
| Conventional Example 10 | 4 | 10 |

It can be seen in Table 15 that the electrolytic capacitors of Examples 19 and 20 show no shortcircuiting during 500 V-50 hour and 550 V-50 hour overvoltage tests while the electrolytic capacitors of Conventional Examples 9 and 10 show shortcircuiting during these overvoltage tests. Thus, the electrolytic capacitors of the present invention exhibit an improved overvoltage resistance.

The electrolytic capacitor according to the first aspect of the present invention comprises a capacitor element formed by winding an anode foil having pits with a diameter of not less than 0.1 $\mu$m formed on the surface thereof and a cathode foil with a separator provided interposed therebetween, said separator having been coated with PVA which is then dried, said capacitor element being in contact with an electrolytic solution for electrolytic capacitor containing ethylene glycol, whereby said electrolytic solution is gelled. The electrolytic capacitor according to the second aspect of the present invention comprises a capacitor element formed by winding an anode foil and a cathode foil with a separator provided interposed therebetween, said separator having been prepared by mixing filament fibers formed by extruding PVA solution into a gas, said capacitor element being impregnated with an electrolytic solution. The electrolytic capacitor according to the third aspect of the present invention is prepared by a process which comprises impregnating a capacitor element formed by winding an anode foil, a cathode foil and a separator with a driving electrolytic solution, inserting said capacitor element into an outer case, sealing the opening of said outer case with a sealing member, and then subjecting said anode to reformation, wherein said driving electrolytic solution contains boric acid and a polyvinyl alcohol is attached to at least both the upper and lower end faces of said capacitor element. Proper selection of the form of PVA in the electrolytic capacitor of the present invention allows PVA dissolved in the electrolytic solution to effectively act on the electrode foil, making it possible to improve the withstand voltage and overvoltage resistance without raising the dielectric loss of the electrolytic capacitor.

Further, if the electrolytic solution contains dicarboxylic acids having side chains and boric acid, it exhibits a high sparking voltage and a high electrical conductivity. Therefore, the synergistic effect obtained by electrolytic capacitor and electrolytic solution makes it possible to obtain an electrolytic capacitor for middle and high voltage having a higher withstand voltage and a high overvoltage resistance without impairing the dielectric loss.

If the electrolytic solution to be used comprises straight-chain aliphatic dicarboxylic acids and boric acid, it exhibits a high electrical conductivity, and the resulting synergistic effect obtained by electrolytic capacitor and electrolytic solution makes it possible to obtain an electrolytic capacitor having a withstand voltage suitable for use in middle and high voltage range and a low dielectric loss. Further, a high overvoltage resistance can be obtained.

While the invention has been described in detail and with reference to specific embodiments thereof, it will be apparent to one skilled in the art that various changes and modifications can be made therein without departing from the spirit and scope thereof.

What is claimed is:

1. An electrolytic capacitor, comprising a capacitor element formed by winding an anode foil having pits with a diameter of not less than 0.1 μm formed on the surface thereof and a cathode foil with a separator provided interposed therebetween, said separator having been coated with a polyvinyl alcohol which is then dried, said capacitor element being in contact with an electrolytic solution for electrolytic capacitor containing ethylene glycol, whereby said electrolytic solution is gelled.

2. The electrolytic capacitor according to claim 1, wherein said electrolytic solution contains boric acid.

3. The electrolytic capacitor according to claim 1, wherein the amount of polyvinyl alcohol attached to said separator is from 0.1 to 50.0 g/m².

4. An electrolytic capacitor, comprising a capacitor element formed by winding an anode foil and a cathode foil with a separator provided interposed therebetween, said separator having been prepared by mixing filament fibers formed by extruding a polyvinyl alcohol solution into a gas, said capacitor element being impregnated with an electrolytic solution.

5. The electrolytic capacitor according to claim 4, wherein said electrolytic solution contains ethylene glycol and boric acid.

6. The electrolytic capacitor according to claim 4, comprising a polyvinyl alcohol having a saponification degree of not less than 90 mol-%.

7. An electrolytic capacitor prepared by a process which comprises impregnating a capacitor element formed by winding an anode foil, a cathode foil and a separator with a driving electrolytic solution, inserting said capacitor element into an outer case, sealing the opening of said outer case with a sealing member, and then subjecting said anode to reformation, wherein said driving electrolytic solution contains boric acid and a polyvinyl alcohol is attached to both the upper and lower end faces of said capacitor element.

8. The electrolytic capacitor according to claim 2, 5 or 7, wherein the content of boric acid is from 0.1 to 40 wt-%.

9. The electrolytic capacitor according to claim 8, wherein said electrolytic solution contains a dicarboxylic acid having side chains, derivative thereof or salt thereof in an amount of from 0.1 to 35 wt-%.

10. The electrolytic capacitor according to claim 9, wherein the content of said dicarboxylic acid having side chains, derivative thereof or salt thereof is from 0.5 to 3 wt-% and the content of boric acid is from 5 to 40 wt-%.

11. The electrolytic capacitor according to claim 9, wherein the content of said dicarboxylic acid having side chains, derivative thereof or salt thereof is from 5 to 25 wt-% and the content of boric acid is from 0.1 to 5 wt-%.

12. The electrolytic capacitor according to claim 8, wherein said electrolytic solution contains a $C_{6-10}$ straight-chain aliphatic saturated dicarboxylic acid, aromatic monocarboxylic acid or salt thereof in an amount of from 0.1 to 35 wt-%.

* * * * *